(12) United States Patent
Yang et al.

(10) Patent No.: US 12,549,403 B2
(45) Date of Patent: Feb. 10, 2026

(54) HARQ FEEDBACK METHOD FOR MULTICAST AND/OR BROADCAST SERVICE, TERMINAL, AND BASE STATION

(71) Applicants: China Mobile Communication Co., Ltd Research Institute, Beijing (CN); China Mobile Communications Group Co., Ltd., Beijing (CN)

(72) Inventors: Tuo Yang, Beijing (CN); Fei Wang, Beijing (CN)

(73) Assignees: China Mobile Communication Co., Ltd Research Institute, Beijing (CN); China Mobile Communications Group Co., Ltd., Beijing (CN)

(*) Notice: Subject to any disclaimer, the term of this patent is extended or adjusted under 35 U.S.C. 154(b) by 318 days.

(21) Appl. No.: 18/547,923

(22) PCT Filed: Jan. 17, 2022

(86) PCT No.: PCT/CN2022/072262
§ 371 (c)(1),
(2) Date: Aug. 25, 2023

(87) PCT Pub. No.: WO2022/179336
PCT Pub. Date: Sep. 1, 2022

(65) Prior Publication Data
US 2025/0023751 A1    Jan. 16, 2025

(30) Foreign Application Priority Data
Feb. 26, 2021 (CN) .......................... 202110220076.5

(51) Int. Cl.
*H04L 12/18* (2006.01)
*H04L 1/1812* (2023.01)
(Continued)

(52) U.S. Cl.
CPC ........ *H04L 12/1868* (2013.01); *H04L 1/1812* (2013.01); *H04L 5/0055* (2013.01); *H04W 72/21* (2023.01); *H04L 2001/0093* (2013.01)

(58) Field of Classification Search
CPC . H04L 12/1868; H04L 1/1812; H04L 5/0055; H04L 2001/0093; H04W 72/21
See application file for complete search history.

(56) References Cited

U.S. PATENT DOCUMENTS 11,997,692 B2 *   5/2024   Rico Alvarino ...... H04L 12/189
12,003,339 B2 *   6/2024   Li ......................... H04W 72/23
(Continued)

FOREIGN PATENT DOCUMENTS

| CN | 104935415 A | 9/2015 |
| CN | 107852713 A | 3/2018 |

(Continued)

OTHER PUBLICATIONS

Catt, "Discussion on reliability improvement mechanism for RRC_CONNECTED UEs in MBS", 3GPP TSG RAN WG1 #103-e, R1-2007836, eMeeting, Oct. 26-Nov. 13, 2020.

(Continued)

*Primary Examiner* — Michael J Moore, Jr.
(74) *Attorney, Agent, or Firm* — Price Heneveld LLP

(57) ABSTRACT

A Hybrid Automatic Repeat reQuest HARQ feedback method for a multicast and/or broadcast service, a terminal and a base station are provided. The method includes: receiving, by a terminal, first indication information transmitted by a network, wherein the first indication information indicates at least one of following information: a Physical Downlink Control CHannel PDCCH detection behavior, a transmission method of the multicast and/or broadcast service, and a Physical Downlink Shared CHannel PDSCH receiving behavior; and determining, by the terminal based (Continued)

---

Receiving, by a terminal, first indication information sent by a network, wherein the first indication information indicates at least one of : a PDCCH detection behavior, a transmission method of the multicast and/or broadcast service, and a PDSCH receiving behavior — 21

Determining, by the terminal based on the first indication information, a PUCCH resource used for reporting HARQ of a PDSCH — 22 on the first indication information, a Physical Uplink Control CHannel PUCCH resource used for reporting HARQ of a PDSCH.

16 Claims, 3 Drawing Sheets

(51) Int. Cl.
*H04L 5/00* (2006.01)
*H04W 72/21* (2023.01)
*H04L 1/00* (2006.01)

(56) References Cited

U.S. PATENT DOCUMENTS

| | | | |
|---|---|---|---|
| 12,150,142 B2 * | 11/2024 | Lee | H04W 72/23 |
| 12,355,575 B2 * | 7/2025 | Yeo | H04W 28/04 |
| 2017/0105198 A1 | 4/2017 | Fu et al. | |
| 2017/0201964 A1 | 7/2017 | Gupta et al. | |
| 2017/0347341 A1 | 11/2017 | Zhang et al. | |
| 2018/0049060 A1 | 2/2018 | Fujishiro et al. | |
| 2019/0190582 A1 | 6/2019 | Guo et al. | |
| 2020/0228931 A1 | 7/2020 | Määttanen et al. | |
| 2021/0409159 A1 | 12/2021 | Zhu | |
| 2022/0086883 A1 * | 3/2022 | Liu | H04W 72/54 |
| 2022/0264612 A1 * | 8/2022 | Yang | H04L 5/0053 |
| 2022/0353887 A1 * | 11/2022 | Xu | H04L 1/0068 |
| 2023/0262735 A1 * | 8/2023 | Wu | H04L 1/1819 370/312 |
| 2023/0337233 A1 * | 10/2023 | Zhou | H04L 5/0055 |
| 2024/0056776 A1 * | 2/2024 | Elmali | H04L 5/0055 |
| 2024/0057088 A1 * | 2/2024 | Matsumura | H04W 72/1273 |
| 2024/0057108 A1 * | 2/2024 | Yi | H04L 1/1854 |
| 2024/0171324 A1 * | 5/2024 | Yang | H04L 1/1864 |
| 2025/0023751 A1 * | 1/2025 | Yang | H04L 5/0091 |

FOREIGN PATENT DOCUMENTS

| | | | |
|---|---|---|---|
| CN | 108476142 A | 8/2018 | |
| CN | 109496398 A | 3/2019 | |
| CN | 110048817 A | 7/2019 | |
| CN | 110235455 A | 9/2019 | |
| CN | 110798296 A | 2/2020 | |
| CN | 111654356 A | 9/2020 | |
| CN | 112187430 A | 1/2021 | |
| WO | WO-2021224733 A1 * | 11/2021 | H04L 1/1854 |

OTHER PUBLICATIONS

Nokia, Nokia Shanghai Bell, "Group Scheduling Mechanisms to Support 5G Multicast / Broadcast Services for RRC_CONNECTED UEs", 3GPP TSG RAN WG1 #104-e, R1-2100510, eMeeting, Jan. 25-Feb. 5, 2021.

Cmcc, "Discussion on reliability improvement", 3GPP Tsg Ran WG1 #103-e, R1-2008035, e-Meeting, October 26th - Nov. 13, 2020.

Catt, "Discussion on reliability improvement mechanism for RRC_CONNECTED UEs in Mbs", 3GPP Tsg Ran WG1 #104-e, R1-2100355, e-Meeting, January 25th - Feb. 5, 2020.

* cited by examiner

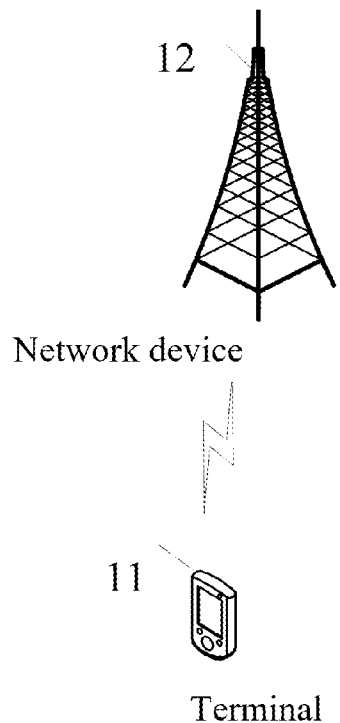

Network device

Terminal

FIG. 1

Receiving, by a terminal, first indication information sent by a network, wherein the first indication information indicates at least one of : a PDCCH detection behavior, a transmission method of the multicast and/ or broadcast service, and a PDSCH receiving behavior ⟋21

Determining, by the terminal based on the first indication information, a PUCCH resource used for reporting HARQ of a PDSCH ⟋22

FIG. 2

HARQ FEEDBACK METHOD FOR MULTICAST AND/OR BROADCAST SERVICE, TERMINAL, AND BASE STATION

CROSS-REFERENCE TO RELATED APPLICATION

This application is a U.S. national phase application of a PCT Application No. PCT/CN2022/072262 filed on Jan. 17, 2022, which is filed based on and claims the priority of a Chinese patent application No. 202110220076.5 filed on Feb. 26, 2021, the disclosure of which is incorporated herein by reference in its entirety.

TECHNICAL FIELD

The present application relates to the technical field of mobile communications, and in particular, to a Hybrid Automatic Repeat reQuest (HARQ) feedback method for multicast and/or broadcast services, a terminal, and a base station.

BACKGROUND

A multicast and/or broadcast technology of a New Radio (NR) system has two wireless transmission methods. One of the methods is a Point to Multiple Point (PTM) transmission in which a solution similar to a Single Cell (SC)-PTM solution in a Long Time Evolution (LTE) is used, a network side uses a common Radio Network Temporary Identifier (RNTI), such as a Group RNTI (Group-RNTI, G-RNTI), to perform Cyclic Redundancy Check (CRC) scrambling of a Physical Downlink Control CHannel (PDCCH), to schedule a Physical Downlink Shared CHannel (PDSCH) carrying corresponding multicast and/or broadcast services, that is, the base station transmits only one PDSCH resource to a plurality of terminals. The other of the methods is a Point-to-Point (PTP) transmission in which a network side schedules a terminal-specific PDSCH by using a terminal-specific PDCCH, this transmission method is similar to a transmission method of a traditional unicast service, that is, the base station transmits a plurality of PDSCH resources to a plurality of terminals. At the same time, in NR multicast and/or broadcast, the network side implements retransmission based on a received negative acknowledgement (NACK) information by introducing an HARQ mechanism, thereby improving a service reliability.

Considering a scenario in which the number of terminals receiving the same multicast and/or broadcast service in a NR system is significant, if each terminal individually feeds back a positive acknowledgement (ACK)/NACK, an overhead of the Physical Uplink Control CHannel (PUCCH) on the network side is large, and PUCCH detection complexity of the base station is also relatively high. Therefore, when the number of terminals is large, a HARQ feedback scheme using only negative acknowledgement (NACK-only) is suitable, that is, the terminal feeds back the NACK only when the terminal fails to correctly receive the PDSCH, and PUCCH resources of NACKs reported by the plurality of terminals are the same, and the base station only needs to detect whether there is a feedback NACK from a terminal, to decide whether to retransmit the PDSCHs of the multicast and/or broadcast services. In addition, a technology of NR multicast and/or broadcast supports PTP and PTM transmission methods, and how to indicate the transmission methods between the terminal and the base station to improve the performance and reliability of the multicast and/or broadcast service is an urgent technical problem to be solved.

SUMMARY

In order to solve the related technical problem, at least one embodiment of the present application provides a HARQ feedback method for a multicast and/or broadcast service, a terminal, and a network device.

According to an aspect of the present application, a Hybrid Automatic Repeat reQuest (HARQ) feedback method for a multicast and/or broadcast service is provided in at least one embodiment of the present application. The method includes: receiving, by a terminal, first indication information transmitted by a network, wherein the first indication information indicates at least one of following information: a Physical Downlink Control CHannel (PDCCH) detection behavior, a transmission method of the multicast and/or broadcast service, and a Physical Downlink Shared CHannel (PDSCH) receiving behavior; and determining, by the terminal based on the first indication information, a Physical Uplink Control CHannel (PUCCH) resource used for reporting HARQ of a PDSCH.

In addition, according to at least one embodiment of the present application, the PDCCH detection behavior includes any one of following: detecting a terminal-specific PDCCH; detecting a common PDCCH; detecting a common PDCCH and a terminal-specific PDCCH.

In addition, according to at least one embodiment of the present application, the common PDCCH is configured to schedule a multicast and/or broadcast service; and/or the terminal-specific PDDCH is configured to schedule a multicast and/or broadcast service.

In addition, according to at least one embodiment of the present application, the transmission method of the multicast and/or broadcast service includes at least one of following: Point-to-Point (PTP) transmission; and Point to Multiple Point (PTM) transmission.

In addition, according to at least one embodiment of the present application, the PDSCH receiving behavior includes any one of following: receiving a PDSCH scheduled by a terminal-specific PDCCH; receiving a PDSCH scheduled by a common PDCCH; receiving a PDSCH scheduled by the terminal-specific PDCCH and a PDSCH scheduled by the common PDCCH.

In addition, according to at least one embodiment of the present application, the PDSCH is configured carry a multicast and/or broadcast service.

In addition, according to at least one embodiment of the present application, the PUCCH resource includes a first PUCCH resource and/or a second PUCCH resource, wherein the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH.

In addition, according to at least one embodiment of the present application, the method further includes: receiving, by the terminal, configuration information of the first PUCCH resource transmitted by the network, wherein the first PUCCH resource is used by a terminal to report HARQ information for a first PDSCH, the first PDSCH is a PDSCH scheduled by the common PDCCH, or a PDSCH delivered by the PTM transmission, the first PUCCH resource is a PUCCH shared by at least one terminal; receiving, by the terminal, configuration information of the second PUCCH resource transmitted by the network, the second PUCCH resource is used by the terminal to report HARQ information of a second PDSCH, the second PDSCH is a PDSCH scheduled by the terminal-specific PDCCH, or a PDSCH delivered by the PTP transmission, and the second PUCCH resource is a terminal-specific PUCCH.

In addition, according to at least one embodiment of the present application, the method further includes: in a case that the first indication information indicates at least one of: detecting the common PDCCH, the PTM transmission and receiving the PDSCH scheduled by the common PDCCH, if the terminal does not correctly decode a first type of data packet transmitted on a PDSCH scheduled by the common PDCCH or a PDSCH delivered by the PTM transmission, feeding back HARQ information of the first type of data packet on the first PUCCH resource.

In addition, according to at least one embodiment of the present application, the method further comprises in a case that the first indication information indicates at least one of: detecting the terminal-specific PDCCH, the PTP transmission, and receiving the PDSCH scheduled by the terminal-specific PDCCH, feeding back, by a terminal on the second PUCCH, HARQ information of the second type of data packet transmitted on the PDSCH scheduled by the terminal-specific PDCCH or the PDSCH delivered by the PTP transmission.

In addition, according to at least one embodiment of the present application, the method further includes: in a case that the first indication information indicates at least one of following: detecting a common PDCCH and a terminal-specific PDCCH, PTP transmission and PTM transmission, and receiving a PDSCH scheduled by a terminal-specific PDCCH and a PDSCH scheduled by a common PDCCH, if the terminal does not correctly decode a third type of data packet transmitted on a PDSCH scheduled by the common PDCCH or a PDSCH delivered by the PTM transmission, and does not correctly decode a same third type of data packet transmitted on the PDSCH scheduled by the terminal-specific PDCCH or a PDSCH delivered by the PTP transmission, feeding back HARQ information of the third type of data packet on the second PUCCH.

In addition, according to at least one embodiment of the present application, the method further includes: determining, by the terminal according to a predefined first feedback policy, or according to second indication information transmitted by the network, that HARQ information of the third type of data packet is reported on the second PUCCH.

In addition, according to at least one embodiment of the present application, the method further includes: in a case that the first indication information indicates at least one of: detecting a common PDCCH and a terminal-specific PDCCH, PTP transmission and PTM transmission, and receiving a PDSCH scheduled by the terminal-specific PDCCH and a PDSCH scheduled by the common PDCCH, if the terminal successfully receives a fourth type of data packet transmitted on the PDSCH scheduled by the common PDCCH or a PDSCH delivered by the PTM transmission, and/or successfully receives a same fourth type of data packet on the PDSCH scheduled by the terminal-specific PDCCH or a PDSCH delivered by the PTP transmission, then feeding back HARQ information of the fourth type of data packet on the second PUCCH.

In addition, according to at least one embodiment of the present application, the method further includes: determining, according to a predefined second feedback policy, or according to third indication information transmitted by the network, that HARQ information of the fourth type of data packet is reported on the second PUCCH.

According to another aspect of the present application, a Hybrid Automatic Repeat reQuest (HARQ) feedback method for a multicast and/or broadcast service is provided in at least one embodiment. The method includes: sending first indication information to a terminal by a base station, wherein the first indication information indicates at least one of following information: a Physical Downlink Control CHannel (PDCCH) detection behavior, a transmission method of the multicast and/or broadcast service, and a Physical Downlink Shared CHannel (PDSCH) receiving behavior; and determining, by the base station based on the first indication information, a Physical Uplink Control CHannel (PUCCH) resource used by the terminal for reporting HARQ of a PDSCH, and detecting, on the determined PUCCH resource, HARQ feedback information transmitted by the terminal.

In addition, according to at least one embodiment of the present application, the PDCCH detection behavior includes any one of following: detecting a terminal-specific PDCCH; detecting a common PDCCH; detecting a common PDCCH and a terminal-specific PDCCH.

In addition, according to at least one embodiment of the present application, the transmission method of the multicast and/or broadcast service includes at least one of following: Point-to-Point (PTP) transmission; and Point to Multiple Point (PTM) transmission.

In addition, according to at least one embodiment of the present application, the PDSCH receiving behavior includes any one of following: receiving a PDSCH scheduled by a terminal-specific PDCCH; receiving a PDSCH scheduled by a common PDCCH; receiving a PDSCH scheduled by the terminal-specific PDCCH and a PDSCH scheduled by the common PDCCH.

In addition, according to at least one embodiment of the present application, the PUCCH resource includes a first PUCCH resource and/or a second PUCCH resource, wherein the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH.

In addition, according to at least one embodiment of the present application, the method further includes sending, by the base station, configuration information of the first PUCCH resource to the terminal, wherein the first PUCCH resource is used by the terminal to report HARQ information for a first PDSCH, the first PDSCH is a PDSCH scheduled by the common PDCCH, or a PDSCH delivered by the PTM transmission, the first PUCCH resource is a PUCCH shared by at least one terminal; sending, by the base station, configuration information of the second PUCCH resource to the terminal, the second PUCCH resource is used by the terminal to report HARQ information of a second PDSCH, the second PDSCH is a PDSCH scheduled by the terminal-specific PDCCH, or a PDSCH delivered by the PTP transmission, and the second PUCCH resource is a terminal-specific PUCCH.

In addition, according to at least one embodiment of the present application, determining, by the base station based on the first indication information, the PUCCH resource used by the terminal for reporting the HARQ of the PDSCH, and detecting, on the determined PUCCH resource, the HARQ feedback information transmitted by the terminal includes: in a case that the first indication information indicates at least one of: detecting a common PDCCH, PTM transmission and receiving a PDSCH scheduled by the common PDCCH, detecting, on a first PUCCH resource by the base station, HARQ information of a first type of data packet transmitted from the terminal, wherein the first type of data packet is a type of data packet that the terminal fails to successfully receive on the PDSCH scheduled by the common PDCCH or the PDSCH delivered by the PTM transmission.

In addition, according to at least one embodiment of the present application, determining, by the base station based on the first indication information, the PUCCH resource used by the terminal for reporting the HARQ of the PDSCH, and detecting, on the determined PUCCH resource, the HARQ feedback information transmitted by the terminal includes: in a case that the first indication information indicates at least one of: detecting a terminal-specific PDCCH, PTP transmission, and receiving a PDSCH scheduled by a terminal-specific PDCCH, detecting, by the base station on a second PUCCH resource, HARQ information of the second type of data packet transmitted by the terminal, wherein the second type of data packet is the data packet transmitted on the PDSCH scheduled by the terminal-specific PDCCH or the PDSCH delivered by the PTP transmission.

In addition, according to at least one embodiment of the present application, determining, by the base station based on the first indication information, the PUCCH resource used by the terminal for reporting the HARQ of the PDSCH, and detecting, on the determined PUCCH resource, the HARQ feedback information transmitted by the terminal includes: in a case that the first indication information indicates at least one of: detecting a common PDCCH and a terminal-specific PDCCH, PTP transmission and PTM transmission, and receiving a PDSCH scheduled by the terminal-specific PDCCH and a PDSCH scheduled by the common PDCCH, detecting, by the base station on the second PUCCH resource, HARQ information for the third type of data packet transmitted by the terminal, wherein the third type of data packet is a same third type of data packet which the terminal does not correctly decode both on the PDSCH scheduled by the common PDCCH or on the PDSCH delivered by the PTM transmission, and on the PDSCH scheduled by the terminal-specific PDCCH or on the PDSCH delivered by the PTP transmission.

In addition, according to at least one embodiment of the present application, the method further includes: determining, by the base station according to a predefined first feedback policy, that HARQ information for the third type of data packet is detected on the second PUCCH: or, sending second indication information to the terminal by the base station, to instruct the terminal to report the HARQ information for the third type of data packet on the second PUCCH.

In addition, according to at least one embodiment of the present application, determining, by the base station based on the first indication information, the PUCCH resource used by the terminal for reporting the HARQ of the PDSCH, and detecting, on the determined PUCCH resource, the HARQ feedback information transmitted by the terminal includes: in case that the first indication information indicates at least one of: detecting a common PDCCH and a terminal-specific PDCCH, PTP transmission and PTM transmission, and receiving a PDSCH scheduled by a terminal-specific PDCCH and a PDSCH scheduled by a common PDCCH, detecting, by the base station on the second PUCCH resource, HARQ information for a fourth type of data packet transmitted by the terminal, wherein the fourth type of data packet is a data packet successfully received by the terminal on the PDSCH scheduled by the common PDCCH or a PDSCH delivered by the PTM transmission, and/or a same data packet successfully received on the PDSCH scheduled by the terminal-specific PDCCH or the PDSCH delivered by the PTP transmission.

In addition, according to at least one embodiment of the present application, the method further includes: determining, by the base station according to a predefined second feedback policy, that HARQ information for a fourth type of data packet is detected on a second PUCCH: or, sending third indication information to the terminal by the base station, to instruct the terminal to report HARQ information for the fourth type of data packet on the second PUCCH.

According to another aspect of the present application, a terminal is provided in at least one embodiment, the terminal includes: a transceiver and a processor, wherein the transceiver is configured to receive first indication information transmitted by a network, wherein the first indication information indicates at least one of following information: a Physical Downlink Control CHannel (PDCCH) detection behavior, a transmission method of the multicast and/or broadcast service, and a Physical Downlink Shared CHannel (PDSCH) receiving behavior: the processor is configured to determine, based on the first indication information, a Physical Uplink Control CHannel (PUCCH) resource used for reporting HARQ of a PDSCH.

According to another aspect of the present application, a terminal is provided in at least one embodiment, the terminal includes a processor, a memory, and a program stored on the memory and executable by the processor, wherein when the program is executed by the processor, the steps of the method described above are implemented.

According to another aspect of the present application, a base station is provided in at least one embodiment. The base station includes a transceiver and a processor, wherein the transceiver is configured to send first indication information to a terminal, wherein the first indication information indicates at least one of following information: a Physical Downlink Control CHannel (PDCCH) detection behavior, a transmission method of a multicast and/or broadcast service, and a Physical Downlink Shared CHannel (PDSCH) receiving behavior: the processor is configured to determine, based on the first indication information, a Physical Uplink Control CHannel (PUCCH) resource used by the terminal for reporting HARQ of a PDSCH, and detect, on the determined PUCCH resource, HARQ feedback information transmitted by the terminal.

According to another aspect of the present application, a base station is provided in at least one embodiment. The base station includes: a processor, a memory, and a program stored on the memory and executable by the processor, wherein when the program is executed by the processor, the steps of the method described above are implemented.

According to another aspect of the present application, a computer-readable storage medium is provided in at least one embodiment, wherein a computer program is stored on the computer-readable storage medium, and when the computer program is executed by a processor, the steps of the method described above are implemented by the processor.

Compared with the related art, the HARQ feedback method of the multicast and/or broadcast service, the terminal and the base station provided in the embodiments of the present application can implement indication of the transmission method of the multicast and/or broadcast service, and improve the transmission performance and reliability. In addition, the present application may further indicate the terminal to report HARQ information on the PUCCH resource associated with the terminal-specific PDCCH or indicated by the terminal-specific PDCCH, so that the base station may determine which terminal does not correctly decode the third type of data packet, and the third type of data packet may be retransmitted to the terminal in a unicast manner, so as to save transmission resource overheads.

BRIEF DESCRIPTION OF THE DRAWINGS

Various other advantages and benefits will become apparent to those of ordinary skill in the art upon reading the detailed description of optional embodiments below. The drawings are only used to illustrate the objectives of the optional embodiments, and are not to be considered as limiting the present application. Moreover, the same reference symbols are used to represent the same components throughout the drawings. In the drawings:

FIG. 1 is a schematic diagram of an application scenario according to some embodiments of the present application:

FIG. 2 is a flowchart of an HARQ feedback method of multicast and/or broadcast services applied to a terminal side according to some embodiments of the present application:

DETAILED DESCRIPTION

Figure 3:
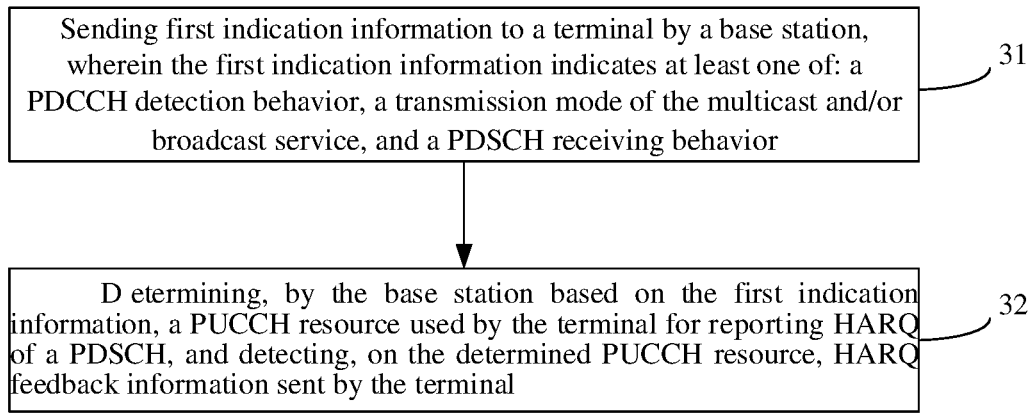
FIG. 3 is a flowchart of an HARQ feedback method of multicast and/or broadcast services applied to a base station side according to some embodiments of the present application.

Exemplary embodiments of the present application will be described in more detail below with reference to the accompanying drawings. Although exemplary embodiments of the present application are shown in the accompanying drawings, it should be understood that the present application may be implemented in various forms and should not be limited by the embodiments set forth herein. Rather, these embodiments are provided in order to enable those skilled in the art to understand the present application more thoroughly, and to fully convey the scope of the present application to those skilled in the art.

The terms "first", "second" and the like in the specification and claims of the present application are configured to distinguish similar objects, and do not need to be used to describe a specific sequence or order. It should be understood that the terms used in this way may be interchanged under appropriate circumstances so that the embodiments of the present application described herein can be implemented, for example, in an order other than those illustrated or described herein. Furthermore, the terms "include" and "have" and any variations thereof are intended to cover non-exclusive inclusion, for example, processes, methods, systems, products, or devices that include a series of steps or units are not necessarily limited to those steps or units clearly listed, but may include other steps or units not expressly listed or inherent to these processes, methods, products, or devices. "and/or" in the description and the claims represent at least one of the connected objects.

The techniques described herein are not limited to NR systems and LTE-Advanced (LTE-A) systems, and may also be used in various wireless communication systems such as Code Division Multiple Access (CDMA), Time Division Multiple Access (TDMA), Frequency Division Multiple Access (FDMA), Orthogonal Frequency Division Multiple Access (OFDM) OFDMA), Single-Carrier Frequency-Division Multiple Access (SC-FDMA), and other systems. The terms "system" and "network" are often used interchangeably. The CDMA system may implement radio technologies such as CDMA2000, Universal Terrestrial Radio Access (UTRA), etc. UTRA includes a Wideband CDMA (Wideband Code Division Multiple Access, WCDMA), and other CDMA variants. A TDMA system may implement radio technologies such as Global System for Mobile Communication (GSM). The OFDMA system may implement radio technologies such as Ultra-Mobile Broadband (UMB), Evolution-UTRA (E-UTRA), IEEE 802.21 (Wi-Fi), IEEE 802.16 802.16 (WiMAX), IEEE 802.20, Flash-OFDM, etc. UTRA and E-UTRA are part of a universal mobile telecommunications system (UMTS). LTE and more advanced LTE (e.g., LTE-A) are new UMTS versions using E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used in both the systems and radio technologies mentioned above, as well as other systems and radio technologies. However, the following description describes NR systems for example purposes, and uses NR terms in most of the following description, although these techniques may also be applied to applications other than NR system applications.

The following description provides examples and does not limit the scope, applicability, or configuration set forth in the claims. Changes may be made to functions and arrangements of the discussed elements without departing from the spirit and the scope of the present disclosure. Various examples may be properly omitted, or be replaced or added with various procedures or components. For example, the described methods may be performed in an order different from the described order, and various steps may be added, omitted, or combined. In addition, features described with reference to certain examples may be combined in other examples.

Referring to FIG. 1, FIG. 1 illustrates a block diagram of a wireless communication system according to some embodiments of the present application. The wireless communication system includes a terminal 11 and a network device 12, where the terminal 11 may also be referred to as a user terminal or a User Equipment (UE), and the terminal 11 may be a terminal-side device such as a mobile phone, a Tablet Personal Computer, a Laptop Computer, a Personal Digital Assistant (PDA), and a Mobile Internet Device (MID), a Wearable Device, or an on-board device. It should be noted that, in this embodiment of the present application, a specific type of the terminal 11 is not limited. The network device 12 may be a base station and/or a core network element, where the base station may be a 5G or later version of a base station (for example, a gNB, a 5G NR NB, etc.), or a base station in other communication systems (for example, an evolved Node B (eNB), a Wireless Local Area Network (WLAN) access point, or other access points, etc.), wherein the base station may be referred to as a Node B, an evolved Node B, and an access point, a Base Transceiver Station (BTS), a radio base station, a radio transceiver, a Basic Service Set (BTS), a radio base station, a radio transceiver, a Basic Service Set (BSS), an Extended Service Set (ESS), a Node B, an eNB, a home Node B, a home evolved Node B, a WLAN access point, a WiFi node, or other suitable terms in the art, as long as the same technical effect is achieved, the base station is not limited to a specific technical vocabulary, and it should be noted that in this embodiment of the present application, only the base station in the NR system is used as an example, but the specific type of the base station is not limited.

The base station may communicate with the terminal 11 under the control of the base station controller, and in various examples, the base station controller may be part of a core network or some base stations. Some base stations may communicate control information or user data with a core network through a backhaul. In some examples, some of these base stations may communicate with each other directly or indirectly through a backhaul link which may be a wired or wireless communication link. A wireless communication system may support operations on multiple carriers (waveform signals of different frequencies). A multi-carrier transmitter can simultaneously transmit a modulated signal on the multiple carriers. For example, each communication link may carry a multi-carrier signal modulated according to various radio technologies. Each modulated signal may be transmitted on a different carrier and may carry control information (e.g., a reference signal, a control channel, etc.), overhead information, data, etc.

The base station may wirelessly communicate with the terminal 11 via one or more access point antennas. Each base station may provide communication coverage for a respective coverage area. The coverage area of an access point may be divided into sectors, each of which forms only a portion of the coverage area. The wireless communication system may include different types of base stations (e.g., macro base stations, micro base stations, or pico base stations). The base station may also utilize different radio technologies, such as cellular or WLAN radio access technologies. The base station may be associated with the same or different access networks or operator deployment. Coverage areas of different base stations (including coverage areas of the same or different types of base stations, coverage areas using the same or different radio technologies, or coverage areas belonging to the same or different access networks) may overlap.

A communication link in a wireless communication system may include an uplink for carrying Uplink (UL) transmission (e.g., from the terminal 11 to the network device 12), or a downlink for carrying Downlink (DL) transmission (e.g., from the network device 12 to the terminal 11). The UL transmission may also be referred to as reverse link transmission, while the DL transmission may also be referred to as forward link transmission. The downlink transmission may be performed using a licensed frequency band, an unlicensed frequency band, or both. Similarly, the uplink transmission may be performed using a licensed frequency band, an unlicensed frequency band, or both.

As described in the background, a NR multicast and/or broadcast technology supports PTP transmission method and PTM transmission method, and if it is desired to improve reception performance of the PDSCH, it is possible to introduce a solution that the terminal receives PDSCHs of the multicast and/or broadcast services through both the PTP transmission and the PTM transmission at the same time, so as to improve demodulation performance of the PDSCHs by means of information merging. The base station needs to make the terminal clearly know that only one of the PTP transmission or the PTM transmission can be used, or both methods can be used at the same time. Meanwhile, considering that the HARQ feedback mechanisms of the PTM and the PTP are different, for example, the PTM is a HARQ feedback mechanism based on NACK-only, while the PTP is a HARQ feedback mechanism based on ACK/NACK, and if the terminal uses the PTP transmission and the PTM transmission at the same time, it is necessary to determine that a HARQ feedback resource of the terminal is a feedback resource configured in the PTM transmission or a feedback resource configured in the PTP transmission. For example, in the NACK-only HARQ feedback mechanism, since the PUCCH resources of feeding back NACKs by the plurality of terminals are the same, the base station cannot distinguish which terminal feeds back the NACK, and if the NACK is detected, retransmission of the PDSCH needs to be performed.

In order to solve at least one of the above problems, an embodiment of the present application provides a HARQ feedback method for multicast and/or broadcast services, which can improve the transmission performance and the reliability of the multicast and/or broadcast services.

Referring to FIG. 2, an HARQ feedback method for a multicast and/or broadcast service provided in an embodiment of the present application includes:

Step 21: the terminal receives first indication information transmitted by a network, where the first indication information indicates at least one of the following information: 1) a PDCCH detection behavior: 2) a transmission method of multicast and/or broadcast services; and 3) a PDSCH receiving behavior.

Here, the first indication information may specifically be one or more of Downlink Control Information (DCI), a high-layer signaling (such as Radio Resource Control (RRC) signaling), or the like. Considering that the terminal may only support the PTP transmission, or only support the PTM transmission, or support both the PTP transmission and the PTM transmission, the PDCCH detection behavior may specifically include any one of the following behaviors:

A) detecting a terminal-specific PDCCH;
 here, the terminal-specific PDCCH is configured to schedule multicast and/or broadcast services;
B) detecting a common PDCCH;
 here, the common PDCCH is configured to schedule multicast and/or broadcast services;
C) detecting a common PDCCH and a terminal-specific PDCCH;
 here, the common PDCCH is configured to schedule multicast and/or broadcast services; and/or, the terminal-specific PDCCH is configured to schedule multicast and/or broadcast services.

The common PDCCH refers to a following PDCCH; a RNTI used to scramble the CRC of the PDCCH is shared by at least one terminal, for example, a PDCCH which uses a G-RNTI to scramble a CRC.

The terminal-specific PDCCH refers to a following PDCCH; an RNTI used to scramble the CRC of the PDCCH is dedicated to a terminal, for example, a PDCCH which uses a C-RNTI to scramble a CRC.

Specifically, a transmission method of a multicast and/or broadcast service includes at least one of the following: PTP transmission, and PTM transmission. That is, the transmission method of the multicast and/or broadcast service may be one or two of the PTP transmission and the PTM transmission.

Specifically, the PDSCH receiving behavior includes any one of the following:

a) receiving a PDSCH scheduled by a terminal-specific PDCCH;
b) receiving a PDSCH scheduled by a common PDCCH;
c) receiving a PDSCH scheduled by the terminal-specific PDCCH and the common PDCCH.

Here, the PDSCH scheduled by the terminal-specific PDCCH and the common PDCCH are both configured to carry multicast and/or broadcast services.

Step 22: the terminal determines, based on the first indication information, a PUCCH resource used for reporting HARQ of the PDSCH.

In this embodiment of the present application, the PUCCH resource specifically includes a first PUCCH resource and/or a second PUCCH resource, where the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH.

Through the above steps, in this embodiment of the present application, at least one of a PDCCH detection behavior, a transmission method of a multicast and/or broadcast service, and a PDSCH receiving behavior is indicated to the terminal through the first indication information, so that the terminal can be indicated to perform data transmission using at least one of the PTP transmission and the PTM transmission. For example, when both the PTP transmission and the PTM transmission are used at the same time, the transmission performance and reliability of the multicast and/or broadcast service may be improved by means of information merging.

In the foregoing method, the terminal may further receive configuration information of the first PUCCH resource transmitted by the network. The first PUCCH resource is used by a terminal to report HARQ information for a first PDSCH; the first PDSCH is a PDSCH scheduled by a common PDCCH, or a PDSCH transmitted in PTP transmission. One embodiment is that the first PUCCH resource is a PUCCH shared by at least one terminal, and is used by the terminal to transmit NACK information in the NACK-only HARQ feedback scheme.

Similarly, the terminal may further receive configuration information of a second PUCCH resource transmitted by the network. The second PUCCH resource is used by the terminal to report HARQ information of a second PDSCH, the second PDSCH is a PDSCH scheduled by a terminal-specific PDCCH, or a PDSCH transmitted in PTP transmission, and the second PUCCH resource is a terminal-specific PUCCH.

In this embodiment of the present application, if the first indication information indicates at least one of: detecting the common PDCCH, the PTM transmission and receiving the PDSCH scheduled by the common PDCCH, if the terminal does not correctly decode a first type of data packet transmitted on the PDSCH scheduled by the common PDCCH or the PDSCH delivered by the PTM transmission, the HARQ information of the first type of data packet is reported on the first PUCCH resource. For example, the terminal may adopt the NACK-only HARQ feedback scheme, that is, the terminal feeds back a negative acknowledgement (NACK) only when the terminal fails to correctly receive the first type of data packet, and feeds back NACK information of the first type of data packet on the first PUCCH resource.

In this embodiment of the present application, when the first indication information indicates at least one of: detecting a terminal-specific PDCCH, PTP transmission, and receiving a PDSCH scheduled by a terminal-specific PDCCH, the terminal feeds back, on the second PUCCH, HARQ information of the second type of data packet transmitted on the PDSCH scheduled by the terminal-specific PDCCH or the PDSCH delivered by the PTP transmission. For example, the terminal may report ACK or NACK information of the second type of data packet on the second PUCCH.

In this embodiment of the present application, in a case that the first indication information indicates at least one of: detecting the common PDCCH and the terminal-specific PDCCH, the PTP transmission and the PTM transmission, and receiving the PDSCH scheduled by the terminal-specific PDCCH and the common PDCCH, if the terminal does not correctly decode a third type of data packet transmitted on a PDSCH scheduled by the common PDCCH or a PDSCH delivered by the PTM transmission, and does not correctly decode the same third type of data packet on the PDSCH scheduled by the terminal-specific PDCCH or the PDSCH delivered by the PTP transmission, then HARQ information of the third type of data packet is reported on a second PUCCH. For example, the terminal feeds back a NACK when the terminal fails to correctly receive the third type of data packet on neither of the two PDSCHs, and feeds back NACK information for the third type of data packet on the second PUCCH resource. In this way, the terminal may report the NACK information of the third type of data packet on the second PUCCH resource, which does not affect other terminals that have correctly received the third type of data packet, and may also implement retransmission of the terminal. Considering that the first PUCCH is a PUCCH shared by a plurality of terminals, if one terminal feeds back NACK information on the first PUCCH resource, the base station must perform retransmissions of all the terminals in a PTM manner, and terminals having correctly received the third type of data packet also need to receive PDCCHs and PDSCHs, causing an unnecessary overhead of power consumption. However, since the second PUCCH is a PUCCH resource associated with the terminal-specific PDCCH or a PUCCH resource indicated by the terminal-specific PDCCH, after the base station receives the NACK information on the second PUCCH, the base station may determine which terminal does not correctly decode the third type of data packet, so that the third type of data packet may be retransmitted to the terminal in a unicast manner, so as to save a transmission resource overhead. In addition, the resource utilization efficiency of retransmission can also be improved, and will not cause other terminals having correctly received the third type of data packet to perform repeated reception.

In this embodiment of the present application, a policy for feeding back the HARQ information of the third type of data packet on the second PUCCH may be pre-agreed and configured at both the network side and the terminal side, or may be indicated to the terminal by the network through the second indication information. That is, the terminal may determine, according to a predefined feedback policy, or according to the second indication information transmitted by the network, that HARQ information of the third type of data packet is reported on the second PUCCH.

In the embodiments of the present application, in a case that the first indication information indicates at least one of: detecting the common PDCCH and the terminal-specific PDCCH, the PTP transmission and the PTM transmission, and receiving the PDSCH scheduled by the terminal-specific PDCCH and the common PDCCH, if the terminal successfully receives a fourth type of data packet transmitted on a PDSCH scheduled by the common PDCCH or a PDSCH delivered by the PTM transmission, and/or successfully receives the same fourth type of data packet on the PDSCH scheduled by the terminal-specific PDCCH or the PDSCH delivered by the PTP transmission, then HARQ information of the fourth type of data packet is reported on the second PUCCH. For example, when the terminal successfully receives the fourth type of data packet on at least one of the two PDSCHs, the terminal may report ACK information on the second PUCCH. The two PDSCHs are: 1) the PDSCH scheduled by the common PDCCH or the PDSCH delivered by the PTM transmission; and 2) the PDSCH scheduled by the terminal-specific PDCCH or the PDSCH delivered by the PTP transmission.

Similarly, the terminal may determine, according to a predefined second feedback policy, or according to third indication information transmitted by the network, that HARQ information of the fourth type of data packet is reported on the second PUCCH.

Referring to FIG. 3, an HARQ feedback method of a multicast and/or broadcast service provided in the embodiments of the present application includes steps 31 and 32.

Step 31: the base station sends first indication information to the terminal, where the first indication information indicates at least one of the following information: 1) a PDCCH detection behavior: 2) a transmission method of a multicast and/or broadcast service; and 3) a PDSCH receiving behavior.

Here, the first indication information may specifically be one or more of Downlink Control Information (DCI), a high-layer signaling (such as Radio Resource Control (RRC) signaling), or the like. The PDCCH detection behavior may specifically include any one of the following behaviors: detecting a terminal-specific PDCCH; detecting a common PDCCH; detecting a common PDCCH and a terminal-specific PDCCH.

The transmission method of the multicast and/or broadcast service includes at least one of the following: PTP transmission, and PTM transmission.

The PDSCH receiving behavior includes any one of the following: receiving a PDSCH scheduled by a terminal-specific PDCCH; receiving a PDSCH scheduled by a common PDCCH; receiving a PDSCH scheduled by the terminal-specific PDCCH and the common PDCCH.

Step 32: the base station determines, according to the first indication information, a PUCCH resource used by the terminal to report HARQ of the PDSCH, and detects, on the determined PUCCH resource, HARQ feedback information transmitted by the terminal.

Herein, the PUCCH resource specifically includes a first PUCCH resource and/or a second PUCCH resource, where the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH.

Through the above steps, in this embodiment of the present application, the terminal can be configured to operate only in one of the PTP transmission or the PTM transmission, or operate in both the PTP transmission and the PTM transmission, the transmission performance and reliability of the multicast and/or broadcast service may be improved. For example, when both the PTP transmission and the PTM transmission are used at the same time, the transmission performance and reliability of the multicast and/or broadcast service may be improved by means of information merging In this embodiment of the present application, the base station may further send configuration information of the first PUCCH resource to the terminal, where the first PUCCH resource is used by the terminal to report HARQ information for the first PDSCH, the first PDSCH is a PDSCH scheduled by a common PDCCH or delivered by the PTM transmission, and the first PUCCH resource is a PUCCH shared by at least one terminal.

In addition, the base station may further send configuration information of the second PUCCH resource to the terminal, where the second PUCCH resource is used by the terminal to report HARQ information for a second PDSCH, the second PDSCH is a PDSCH scheduled by the terminal-specific PDCCH or delivered by the PTP transmission, and the second PUCCH resource is the terminal-specific PUCCH.

Specifically, in the above step 32:
1) in a case that the first indication information indicates at least one of: detecting the common PDCCH, the PTM transmission and receiving the PDSCH scheduled by the common PDCCH, the base station may detect the HARQ information of the first type of data packet transmitted by the terminal on the first PUCCH resource. The first type of data packet is a type of data packet that the terminal does not correctly decode on the PDSCH scheduled by the common PDCCH or the PDSCH delivered by the PTM transmission. For example, the terminal may adopt the NACK-only HARQ feedback scheme, that is, the terminal feeds back a negative acknowledgement (NACK) only when the terminal fails to correctly receive the first type of data packet, and feeds back NACK information of the first type of data packet on the first PUCCH resource. The base station detects, on the first PUCCH resource, NACK information of the first type of data packet transmitted by the terminal. If the base station detects the NACK information, then the base station retransmits the first type of data packet through the PTM transmission.

2) in a case that the first indication information indicates at least one of: detecting a terminal-specific PDCCH, PTP transmission, and receiving a PDSCH scheduled by a terminal-specific PDCCH, the base station may detect, on the second PUCCH resource, HARQ information of the second type of data packet transmitted by the terminal. The second type of data packet is the second type of data packet transmitted on the PDSCH scheduled by the terminal-specific PDCCH or the PDSCH delivered by the PTP transmission.

For example, the terminal may report ACK or NACK information of the second type of data packet on the second PUCCH. The base station determines, according to the detected ACK or NACK information, whether the terminal successfully receives the second type of data packet. For example, when detecting the NACK information, the base station determines that the terminal does not correctly decode the second type of data packet, in this case, the base station may retransmit the second type of data packet to the terminal through the PTP transmission. When detecting the ACK information, the base station determines that the terminal has successfully received the second type of data packet, in this case, retransmitting the second type of data packet is unnecessary.

3) in a case that the first indication information indicates at least one of: detecting the common PDCCH and the terminal-specific PDCCH, the PTP transmission and the PTM transmission, and receiving the PDSCH scheduled by the terminal-specific PDCCH and the common PDCCH, i.e., when the first indication information indicates at least one of: detecting the common PDCCH and the terminal-specific PDCCH, two transmission methods (the PTP transmission and the PTM transmission), two receiving behavior (receiving the PDSCH scheduled by the terminal-specific PDCCH and the PDSCH scheduled by the common PDCCH), the base station detects, on the second PUCCH resource, HARQ information for the third type of data packet transmitted by the terminal. The third type of data packet is the same third type of data packet which the terminal does not correctly decode on the PDSCH scheduled by the common PDCCH or on the PDSCH delivered by the PTM transmission, and on the PDSCH scheduled by the terminal-specific PDCCH or on the PDSCH delivered by the PTP transmission.

For example, the terminal feeds back NACK information of the third type of data packet on the second PUCCH resource only when the terminal fails to correctly receive the third type of data packet on neither of the two PDSCHs. Since the second PUCCH is a PUCCH resource associated with the terminal-specific PDCCH or indicated by the terminal-specific PDCCH, after the base station receives the NACK information on the second PUCCH, the base station may determine a target terminal that does not correctly decode the third type of data packet, so that the third type of data packet may be retransmitted to the target terminal through the PTP transmission, so as to save transmission resource overheads. In contrast, if the terminal feeds back the NACK information on the first PUCCH resource, then since the first PUCCH resource is shared by the plurality of terminals, the base station cannot confirm which terminal feeds back the NACK, the third type of data packet can only be retransmitted to all the terminals through the PTM transmission. As a result, the terminals having successfully received the third type of data packet repeatedly receive the PDCCH and the PDSCH, thereby causing an energy consumption overhead and a resource waste.

In addition, the base station may determine, according to a predefined first feedback policy, that HARQ information for the third type of data packet is detected on the second PUCCH: or, the base station sends second indication information to the terminal to instruct the terminal to report the HARQ information of the third type of data packet on the second PUCCH.

4) In case that the first indication information indicates at least one of: detecting a common PDCCH and a terminal-specific PDCCH, PTP transmission and PTM transmission, and receiving a PDSCH scheduled by a terminal-specific PDCCH and a PDSCH scheduled by a common PDCCH, the base station detects, on the second PUCCH resource, HARQ information for a fourth type of data packet transmitted by the terminal, where the fourth type of data packet is a data packet successfully received by the terminal on a PDSCH scheduled by the common PDCCH or a PDSCH delivered by the PTM transmission, and/or the same data packet successfully received on a PDSCH scheduled by the terminal-specific PDCCH or a PDSCH delivered by the PTP transmission. That is, the fourth type of data packet is a data packet successfully received by the terminal on at least one of the two PDSCHs. The two PDSCHs are: 1) the PDSCH scheduled by the common PDCCH or the PDSCH delivered by the PTM transmission; and 2) the PDSCH scheduled by the terminal-specific PDCCH or the PDSCH delivered by the PTP transmission.

In addition, the base station may further determine, according to a predefined second feedback policy, that HARQ information for the fourth type of data packet is detected on the second PUCCH: or, the base station sends third indication information to the terminal to instruct the terminal to report the HARQ information of the fourth type of data packet on the second PUCCH.

It can be seen from the foregoing that in the foregoing method in this embodiment of the present application, the base station indicates the terminal to use the PTP or the PTM or both the PTP or the PTM to perform transmission of a multicast and/or broadcast service. In addition, if the terminal simultaneously operates in the PTP transmission and the PTM transmission and fails to correctly receive a certain data packet, the terminal does not need to report NACK information on the first PUCCH resource, but feeds back NACK information on the second PUCCH resource. Therefore, the base station may determine, according to the second PUCCH resource, which terminal fails to correctly receive the data packet, and may use the PTP transmission to perform retransmission without affecting the behavior of other terminals. Otherwise, if the base station receives the NACK information on the first PUCCH resource, and the base station cannot determine the number of terminals that report the NACK information, and also cannot ascertain which terminal feeds back the NACK, the base station can only retransmit the data packet of all the terminals, but it is actually possible that only one terminal fails to correctly receive the data packet, thus, network resource waste is caused, and unnecessary PDCCH detection and unnecessary PDSCH receiving overhead of other terminals are also caused.

Various methods of the embodiments of the present application are described above. The following further provides an apparatus of implementing the above-mentioned method.

Figure 4:
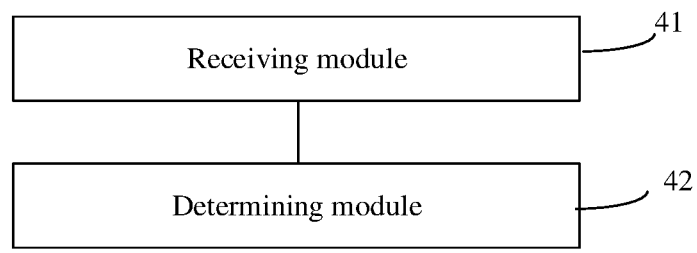
FIG. 4 is a schematic structural diagram of a terminal according to some embodiments of the present application.

Referring to FIG. 4, an embodiment of the present application provides a terminal. The terminal includes: a receiving module 41 and a determining module 42.

The receiving module 41 is configured to receive first indication information transmitted by a network, where the first indication information indicates at least one of the following information: 1) a PDCCH detection behavior: 2) a transmission method of multicast and/or broadcast services; and 3) a PDSCH receiving behavior.

The determining module 42 is configured to determines, based on the first indication information, a PUCCH resource used for reporting HARQ of the PDSCH.

In an embodiment, the PDCCH detection behavior includes any one of the following: A) detecting a terminal-specific PDCCH; B) detecting a common PDCCH; C) detecting a common PDCCH and a terminal-specific PDCCH.

In an embodiment, the common PDCCH is configured to schedule multicast and/or broadcast services; and/or, the terminal-specific PDCCH is configured to schedule multicast and/or broadcast services.

In an embodiment, a transmission method of a multicast and/or broadcast service includes at least one of the following: PTP transmission, and PTM transmission.

In an embodiment, the PDSCH receiving behavior includes any one of the following: a) receiving a PDSCH scheduled by a terminal-specific PDCCH; b) receiving a PDSCH scheduled by a common PDCCH; c) receiving a PDSCH scheduled by the terminal-specific PDCCH and the common PDCCH.

In an embodiment, the PDSCH is configured to carry a multicast and/or broadcast service.

In an embodiment, the PUCCH resource includes a first PUCCH resource and/or a second PUCCH resource, where the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH.

In an embodiment, the receiving module is further configured to: receive configuration information of the first PUCCH resource transmitted by the network, where the first PUCCH resource is used by a terminal to report HARQ information for a first PDSCH: the first PDSCH is a PDSCH scheduled by a common PDCCH, or a PDSCH transmitted in PTM transmission, the first PUCCH resource is a PUCCH shared by at least one terminal: receive configuration information of a second PUCCH resource transmitted by the network, where the second PUCCH resource is used by the terminal to report HARQ information of a second PDSCH, the second PDSCH is a PDSCH scheduled by a terminal-specific PDCCH, or a PDSCH transmitted in PTP transmission, and the second PUCCH resource is a terminal-specific PUCCH.

In an embodiment, the terminal further includes: a first processing module configured to, in a case that the first indication information indicates at least one of: detecting the common PDCCH, the PTM transmission and receiving the PDSCH scheduled by the common PDCCH, and if the terminal does not correctly decode a first type of data packet transmitted on the PDSCH scheduled by the common PDCCH or the PDSCH delivered by the PTM transmission, report the HARQ information of the first type of data packet on the first PUCCH resource.

In an embodiment, the terminal further includes: a second processing module configured to, in a case that the first indication information indicates at least one of: detecting a terminal-specific PDCCH, PTP transmission, and receiving a PDSCH scheduled by a terminal-specific PDCCH, report, on the second PUCCH, HARQ information of the second type of data packet transmitted on the PDSCH scheduled by the terminal-specific PDCCH or the PDSCH delivered by the PTP transmission.

In an embodiment, the terminal further includes: a third processing module configured to, in a case that the first indication information indicates at least one of: detecting the common PDCCH and the terminal-specific PDCCH, the PTP transmission and the PTM transmission, and receiving the PDSCH scheduled by the terminal-specific PDCCH and the common PDCCH, and if the terminal does not correctly decode a third type of data packet transmitted on a PDSCH scheduled by the common PDCCH or a PDSCH delivered by the PTM transmission, and does not correctly decode the same third type of data packet on the PDSCH scheduled by the terminal-specific PDCCH or the PDSCH delivered by the PTP transmission, then report HARQ information of the third type of data packet on a second PUCCH.

In an embodiment, the terminal further includes: a first feedback mode determination module configured to, determine, according to a predefined feedback policy, or according to second indication information transmitted by the network, that HARQ information of the third type of data packet is reported on the second PUCCH.

In an embodiment, the terminal further includes: a fourth processing module configured to, in a case that the first indication information indicates at least one of: detecting the common PDCCH and the terminal-specific PDCCH, the PTP transmission and the PTM transmission, and receiving the PDSCH scheduled by the terminal-specific PDCCH and the common PDCCH, and if the terminal successfully receives a fourth type of data packet transmitted on a PDSCH scheduled by the common PDCCH or a PDSCH delivered by the PTM transmission, and/or successfully receives the same fourth type of data packet on the PDSCH scheduled by the terminal-specific PDCCH or the PDSCH delivered by the PTP transmission, then report HARQ information of the fourth type of data packet on the second PUCCH.

In an embodiment, the terminal further includes: a second feedback mode determination module configured to, determine, according to a predefined second feedback policy, or according to third indication information transmitted by the network, that HARQ information of the fourth type of data packet is reported on the second PUCCH.

It should be noted that the apparatus in this embodiment is an apparatus corresponding to the method shown in FIG. 2, and the implementations in the foregoing embodiments are all applicable to the embodiments of the apparatus, and can also achieve the same technical effect. The above-mentioned apparatus provided in the embodiments of the present application can implement all method steps implemented by the foregoing method embodiments, and the same technical effect can be achieved, and the same parts between the method embodiments and the present embodiment and beneficial effects of the present embodiment are not described in detail herein.

Figure 5:
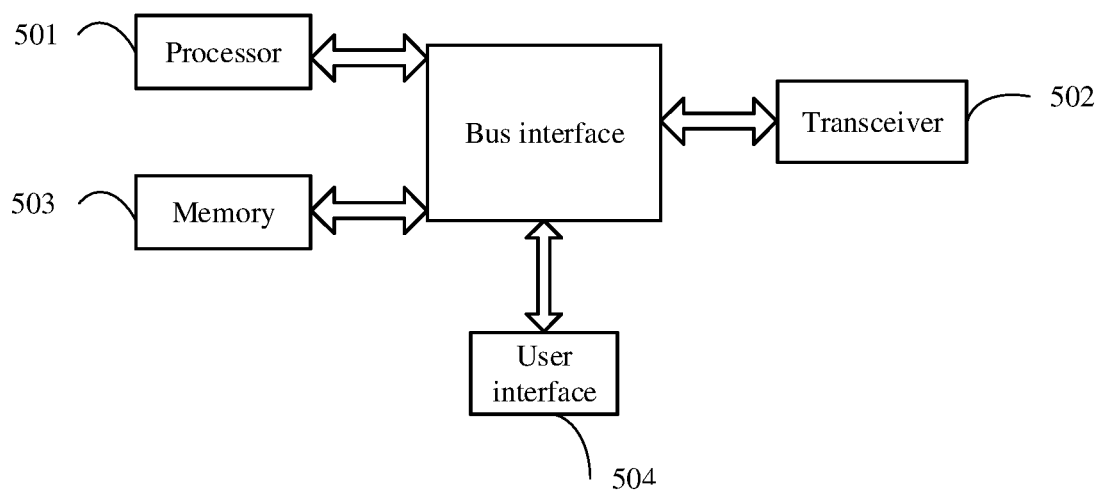
FIG. 5 is another schematic structural diagram of a terminal according to some embodiments of the present application.

Referring to FIG. 5 which is a schematic structural diagram of a terminal provided by an embodiment of the present application. The terminal includes a processor 501, a transceiver 502, a memory 503, a user interface 504, and a bus interface.

In this embodiment of the present application, the terminal further includes a program stored on the memory 503 and executable on the processor 501.

When the processor 501 executes the program, the following steps are implemented:

receiving first indication information transmitted by a network, where the first indication information indicates at least one of the following information: 1) a PDCCH detection behavior: 2) a transmission method of multicast and/or broadcast services; and 3) a PDSCH receiving behavior;

determining, based on the first indication information, a PUCCH resource used for reporting HARQ of the PDSCH.

In an embodiment, the PDCCH detection behavior includes any one of the following: A) detecting a terminal-specific PDCCH; B) detecting a common PDCCH; C) detecting a common PDCCH and a terminal-specific PDCCH.

In an embodiment, the common PDCCH is configured to schedule multicast and/or broadcast services; and/or, the terminal-specific PDCCH is configured to schedule multicast and/or broadcast services.

In an embodiment, a transmission method of a multicast and/or broadcast service includes at least one of the following: PTP transmission, and PTM transmission.

In an embodiment, the PDSCH receiving behavior includes any one of the following: a) receiving a PDSCH scheduled by a terminal-specific PDCCH; b) receiving a PDSCH scheduled by a common PDCCH; c) receiving a PDSCH scheduled by the terminal-specific PDCCH and the common PDCCH.

In an embodiment, the PDSCH is configured to carry a multicast and/or broadcast service.

In an embodiment, the PUCCH resource includes a first PUCCH resource and/or a second PUCCH resource, where the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH.

In an embodiment, when the processor executes the program, the processor further implements following steps: receiving configuration information of the first PUCCH resource transmitted by the network, where the first PUCCH resource is used by a terminal to report HARQ information for a first PDSCH: the first PDSCH is a PDSCH scheduled by a common PDCCH, or a PDSCH transmitted in PTM transmission, the first PUCCH resource is a PUCCH shared by at least one terminal; receiving configuration information of a second PUCCH resource transmitted by the network, where the second PUCCH resource is used by the terminal to report HARQ information of a second PDSCH, the second PDSCH is a PDSCH scheduled by a terminal-specific PDCCH, or a PDSCH transmitted in PTP transmission, and the second PUCCH resource is a terminal-specific PUCCH.

In an embodiment, when the processor executes the program, the processor further implements following steps: in a case that the first indication information indicates at least one of: detecting the common PDCCH, the PTM transmission and receiving the PDSCH scheduled by the common PDCCH, and if a first type of data packet transmitted on the PDSCH scheduled by the common PDCCH or the PDSCH delivered by the PTM transmission is not successfully received, feeding back the HARQ information of the first type of data packet on the first PUCCH resource.

In an embodiment, when the processor executes the program, the processor further implements a following step: in a case that the first indication information indicates at least one of: detecting a terminal-specific PDCCH, PTP transmission, and receiving a PDSCH scheduled by a terminal-specific PDCCH, feeding back, on the second PUCCH, HARQ information of the second type of data packet transmitted on the PDSCH scheduled by the terminal-specific PDCCH or the PDSCH delivered by the PTP transmission.

In an embodiment, when the processor executes the program, the processor further implements following steps: in a case that the first indication information indicates at least one of: detecting the common PDCCH and the terminal-specific PDCCH, the PTP transmission and the PTM transmission, and receiving the PDSCH scheduled by the terminal-specific PDCCH and the common PDCCH, and if a third type of data packet transmitted on a PDSCH scheduled by the common PDCCH or a PDSCH delivered by the PTM transmission is not successfully received, and if the same third type of data packet on the PDSCH scheduled by the terminal-specific PDCCH or the PDSCH delivered by the PTM transmission is not successfully received, then feeding back HARQ information of the third type of data packet on a second PUCCH.

In an embodiment, when the processor executes the program, the processor further implements following steps: determining, according to a predefined first feedback policy, or according to second indication information transmitted by the network, that HARQ information of the third type of data packet is reported on the second PUCCH.

In an embodiment, when the processor executes the program, the processor further implements following steps: in a case that the first indication information indicates at least one of: detecting the common PDCCH and the terminal-specific PDCCH, the PTP transmission and the PTM transmission, and receiving the PDSCH scheduled by the terminal-specific PDCCH and the common PDCCH, and if a fourth type of data packet transmitted on a PDSCH scheduled by the common PDCCH or a PDSCH delivered by the PTM transmission is successfully received, and/or the same fourth type of data packet is successfully received on the PDSCH scheduled by the terminal-specific PDCCH or the PDSCH delivered by the PTP transmission, then feeding back HARQ information of the fourth type of data packet on the second PUCCH.

In an embodiment, when the processor executes the program, the processor further implements following steps: determining, according to a predefined second feedback policy, or according to third indication information transmitted by the network, that HARQ information of the fourth type of data packet is reported on the second PUCCH.

It can be understood that in this embodiment of the present application, when the computer program is executed by the processor 501, each process of the method embodiment shown in FIG. 2 can be implemented, and the same technical effect can be achieved, which is not repeated here for avoiding repetition.

In FIG. 5, the bus architecture may include any number of interconnected buses and bridges. Specifically, various circuits such as one or more processors represented by the processor 501 and a memory represented by the memory 503 are linked together. The bus architecture may also link together various other circuits, such as peripheral devices, voltage regulators, and power management circuits, etc., which are well known in the art, and therefore are not further described herein. The bus interface provides an interface. The transceiver 502 may be a plurality of elements, i.e., include a transmitter and a receiver, and provide a unit for communicating with various other devices over a transmission medium. For different user equipments, the user interface 504 may also be an interface that can be externally connected to a required device, and the connected device includes, but is not limited to, a keypad, a display, a speaker, a microphone, a joystick, etc.

The processor 501 is responsible for managing a bus architecture and general processing, and the memory 503 may store data used by the processor 501 when performing an operation.

It should be noted that the apparatus in this embodiment is an apparatus corresponding to the method shown in FIG. 2, and the implementations in the foregoing embodiments are all applicable to the embodiments of the apparatus, and the same technical effect can also be achieved. In this device, both the transceiver 502 and the memory 503, and the transceiver 502 and the processor 501 may be communicatively connected by means of the bus interface, the functions of the processor 501 may also be implemented by the transceiver 502, and the functions of the transceiver 502 may also be implemented by the processor 501. It should be noted that, the above-mentioned apparatus provided in the embodiments of the present application can implement all method steps implemented by the foregoing method embodiments, and can achieve the same technical effect, and the same parts and beneficial effects between the method embodiments and this embodiment are not described in detail herein.

In some embodiments of the present application, a computer-readable storage medium is further provided, wherein a program is stored thereon, and when the program is executed by the processor, the following steps are implemented:

receiving first indication information transmitted by a network, where the first indication information indicates at least one of the following information: 1) a PDCCH detection behavior: 2) a transmission method of multicast and/or broadcast services; and 3) a PDSCH receiving behavior;

determining, based on the first indication information, a PUCCH resource used for reporting HARQ of the PDSCH.

When the program is executed by the processor, all implementations of the HARQ feedback method for the multicast and/or broadcast service applied to the terminal side can be implemented, and the same technical effect can be achieved, and thus all implementations are not repeated here for avoiding repetition.

Figure 6:
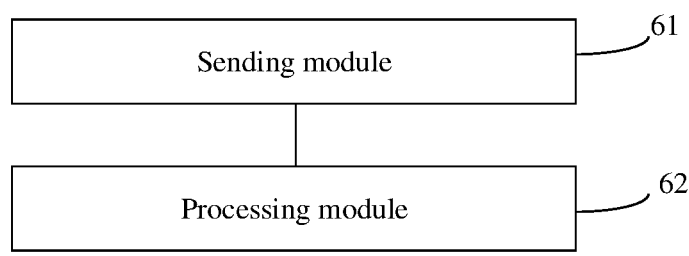
FIG. 6 is a schematic structural diagram of a base station according to some embodiments of the present application.

An embodiment of the present application provides a network side device shown in FIG. 6, the network side device includes a sending module 61 and a processing module 62.

The sending module 61 is configured to send first indication information to the terminal, where the first indication information indicates at least one of the following information: 1) a PDCCH detection behavior: 2) a transmission method of a multicast and/or broadcast service; and 3) a PDSCH receiving behavior.

The processing module 62 is configured to determine, according to the first indication information, a PUCCH resource used by the terminal to report HARQ of the PDSCH, and detect, on the determined PUCCH resource, HARQ feedback information transmitted by the terminal.

In an embodiment, the PDCCH detection behavior includes any one of the following behaviors: detecting a terminal-specific PDCCH; detecting a common PDCCH; detecting a common PDCCH and a terminal-specific PDCCH.

In an embodiment, the transmission method of the multicast and/or broadcast service includes at least one of the following: PTP transmission, and PTM transmission.

In an embodiment, the PDSCH receiving behavior includes any one of the following: receiving a PDSCH scheduled by a terminal-specific PDCCH; receiving a PDSCH scheduled by a common PDCCH; receiving a PDSCH scheduled by the terminal-specific PDCCH and the common PDCCH.

In an embodiment, the PUCCH resource includes a first PUCCH resource and/or a second PUCCH resource, where the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH.

In an embodiment, the sending module is further configured to: send configuration information of the first PUCCH resource to the terminal, where the first PUCCH resource is used by the terminal to report HARQ information for the first PDSCH, the first PDSCH is a PDSCH scheduled by a common PDCCH or delivered by the PTM transmission, and the first PUCCH resource is a PUCCH shared by at least one terminal: send configuration information of the second PUCCH resource to the terminal, where the second PUCCH resource is used by the terminal to report HARQ information for a second PDSCH, the second PDSCH is a PDSCH scheduled by the terminal-specific PDCCH or delivered by the PTP transmission, and the second PUCCH resource is the terminal-specific PUCCH.

In an embodiment, the processing module is further configured to: in a case that the first indication information indicates at least one of: detecting the common PDCCH, the PTM transmission and receiving the PDSCH scheduled by the common PDCCH, detect the HARQ information of the first type of data packet transmitted by the terminal on the first PUCCH resource. The first type of data packet is a type of data packet that the terminal does not correctly decode on the PDSCH scheduled by the common PDCCH or the PDSCH delivered by the PTM transmission.

In an embodiment, the processing module is further configured to: in a case that the first indication information indicates at least one of: detecting a terminal-specific PDCCH, PTP transmission, and receiving a PDSCH scheduled by a terminal-specific PDCCH, detect, on the second PUCCH resource, HARQ information of the second type of data packet transmitted by the terminal. The second type of data packet is the second type of data packet transmitted on the PDSCH scheduled by the terminal-specific PDCCH or the PDSCH delivered by the PTP transmission.

In an embodiment, the processing module is further configured to: in a case that the first indication information indicates at least one of: detecting the common PDCCH and the terminal-specific PDCCH, the PTP transmission and the PTM transmission, and receiving the PDSCHs scheduled by the terminal-specific PDCCH and the common PDCCH, detect, on the second PUCCH resource, HARQ information for the third type of data packet transmitted by the terminal. The third type of data packet is the same third type of data packet which the terminal does not correctly decode on the PDSCH scheduled by the common PDCCH or on the PDSCH delivered by the PTM transmission, and on the PDSCH scheduled by the terminal-specific PDCCH or on the PDSCH delivered by the PTP transmission.

In an embodiment, the base station further includes: a first determining module configured to determine, according to a predefined first feedback policy, that HARQ information for the third type of data packet is detected on the second PUCCH: or, send second indication information to the terminal to instruct the terminal to report the HARQ information of the third type of data packet on the second PUCCH.

In an embodiment, the processing module is further configured to: in case that the first indication information indicates at least one of: detecting a common PDCCH and a terminal-specific PDCCH, PTP transmission and PTM transmission, and receiving a PDSCH scheduled by a terminal-specific PDCCH and a PDSCH scheduled by a common PDCCH, detect, on the second PUCCH resource, HARQ information for a fourth type of data packet transmitted by the terminal, where the fourth type of data packet is a data packet successfully received by the terminal on a PDSCH scheduled by the common PDCCH or a PDSCH delivered by the PTM transmission, and/or the same data packet successfully received on a PDSCH scheduled by the terminal-specific PDCCH or a PDSCH delivered by the PTP transmission.

In an embodiment, the base station further includes: a second determining module configured to determine, according to a predefined second feedback policy, that HARQ information for the fourth type of data packet is detected on the second PUCCH; or, send third indication information to the terminal to instruct the terminal to report the HARQ information of the fourth type of data packet on the second PUCCH.

It should be noted that the apparatus in this embodiment is an apparatus corresponding to the method shown in FIG. 3, and the implementations in the foregoing embodiments are all applicable to the embodiments of the apparatus, and can also achieve the same technical effect. The above-mentioned apparatus provided in the embodiments of the present application can implement all method steps implemented by the foregoing method embodiments, and the same technical effect can be achieved, and the same parts between the method embodiments and the present embodiment and beneficial effects of the present embodiment are not described in detail herein.

Figure 7:
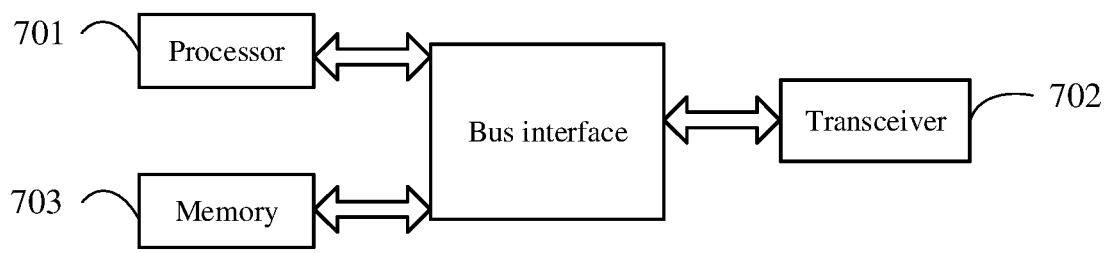
FIG. 7 is another schematic structural diagram of a base station according to some embodiments of the present application.

Referring to FIG. 7 which is a schematic structural diagram of a network side device (i.e., a base station) provided by an embodiment of the present application. The base station includes a processor 701, a transceiver 702, a memory 703, and a bus interface.

In the embodiment of the present application, the network side device further includes a program stored on the memory 703 and executable on the processor 701.

When the processor 701 executes the program, the following steps are implemented by the processor 701: sending first indication information to the terminal, where the first indication information indicates at least one of the following information: 1) a PDCCH detection behavior: 2) a transmission method of a multicast and/or broadcast service; and 3) a PDSCH receiving behavior: determining, according to the first indication information, a PUCCH resource used by the terminal to report HARQ of the PDSCH, and detecting, on the determined PUCCH resource, HARQ feedback information transmitted by the terminal.

In an embodiment, the PDCCH detection behavior includes any one of the following behaviors: detecting a terminal-specific PDCCH; detecting a common PDCCH; detecting a common PDCCH and a terminal-specific PDCCH.

In an embodiment, the transmission method of the multicast and/or broadcast service includes at least one of the following: PTP transmission, and PTM transmission.

In an embodiment, the PDSCH receiving behavior includes any one of the following: receiving a PDSCH scheduled by a terminal-specific PDCCH; receiving a PDSCH scheduled by a common PDCCH; receiving a PDSCH scheduled by the terminal-specific PDCCH and the common PDCCH.

In an embodiment, the PUCCH resource includes a first PUCCH resource and/or a second PUCCH resource, where the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH.

In an embodiment, when the processor executes the program, the following steps are implemented by the processor: sending configuration information of the first PUCCH resource to the terminal, where the first PUCCH resource is used by the terminal to report HARQ information for the first PDSCH, the first PDSCH is a PDSCH scheduled by a common PDCCH or delivered by the PTM transmission, and the first PUCCH resource is a PUCCH shared by at least one terminal: sending configuration information of the second PUCCH resource to the terminal, where the second PUCCH resource is used by the terminal to report HARQ information for a second PDSCH, the second PDSCH is a PDSCH scheduled by the terminal-specific PDCCH or delivered by the PTP transmission, and the second PUCCH resource is the terminal-specific PUCCH.

In an embodiment, when the processor executes the program, the following steps are implemented by the processor: in a case that the first indication information indicates at least one of: detecting the common PDCCH, the PTM transmission and receiving the PDSCH scheduled by the common PDCCH, detecting the HARQ information of the first type of data packet transmitted by the terminal on the first PUCCH resource. The first type of data packet is a type of data packet that the terminal does not correctly decode on the PDSCH scheduled by the common PDCCH or the PDSCH delivered by the PTM transmission.

In an embodiment, when the processor executes the program, the following steps are implemented by the processor: in a case that the first indication information indicates at least one of: detecting a terminal-specific PDCCH, PTP transmission, and receiving a PDSCH scheduled by a terminal-specific PDCCH, detecting, on the second PUCCH resource, HARQ information of the second type of data packet transmitted by the terminal. The second type of data packet is the second type of data packet transmitted on the PDSCH scheduled by the terminal-specific PDCCH or the PDSCH delivered by the PTP transmission.

In an embodiment, when the processor executes the program, the following steps are implemented by the processor: in a case that the first indication information indicates at least one of: detecting the common PDCCH and the terminal-specific PDCCH, the PTP transmission and the PTM transmission, and receiving the PDSCHs scheduled by the terminal-specific PDCCH and the common PDCCH, detecting, on the second PUCCH resource, HARQ information for the third type of data packet transmitted by the terminal. The third type of data packet is the same third type of data packet which the terminal does not correctly decode on the PDSCH scheduled by the common PDCCH or on the PDSCH delivered by the PTM transmission, and on the PDSCH scheduled by the terminal-specific PDCCH or on the PDSCH delivered by the PTP transmission.

In an embodiment, when the processor executes the program, the following steps are further implemented by the processor: determining, according to a predefined first feedback policy, that HARQ information for the third type of data packet is detected on the second PUCCH; or, sending second indication information to the terminal to instruct the terminal to report the HARQ information of the third type of data packet on the second PUCCH.

In an embodiment, when the processor executes the program, the following steps are further implemented by the processor: in case that the first indication information indicates at least one of: detecting a common PDCCH and a terminal-specific PDCCH, PTP transmission and PTM transmission, and receiving a PDSCH scheduled by a terminal-specific PDCCH and a PDSCH scheduled by a common PDCCH, detecting, on the second PUCCH resource, HARQ information for a fourth type of data packet transmitted by the terminal, where the fourth type of data packet is a data packet successfully received by the terminal on a PDSCH scheduled by the common PDCCH or a PDSCH delivered by the PTM transmission, and/or the same data packet successfully received on a PDSCH scheduled by the terminal-specific PDCCH or a PDSCH delivered by the PTP transmission.

In an embodiment, when the processor executes the program, the following steps are further implemented by the processor: determining, according to a predefined second feedback policy, that HARQ information for the fourth type of data packet is detected on the second PUCCH: or, sending third indication information to the terminal to instruct the terminal to report the HARQ information of the fourth type of data packet on the second PUCCH.

It can be understood that in this embodiment of the present application, when the computer program is executed by the processor 701, each process of the method embodiment shown in FIG. 4 can be implemented, and the same technical effect can be achieved, which is not repeated here for avoiding repetition.

In FIG. 7, the bus architecture may include any number of interconnected buses and bridges. Specifically, various circuits such as one or more processors represented by the processor 701 and a memory represented by the memory 703 are linked together. The bus architecture may also link together various other circuits, such as peripheral devices, voltage regulators, and power management circuits, etc., which are well known in the art, and therefore are not further described herein. The bus interface provides an interface. The transceiver 702 may be a plurality of elements, i.e., include a transmitter and a receiver, and provide a unit for communicating with various other devices over a transmission medium.

The processor 701 is responsible for managing a bus architecture and general processing, and the memory 703 may store data used by the processor 701 when performing an operation.

It should be noted that the network side device in this embodiment is a device corresponding to the method shown in FIG. 4, and the implementations in the foregoing embodiments are all applicable to the embodiments of the network side device, and the same technical effect can also be achieved. In this device, both the transceiver 702 and the memory 703, and the transceiver 702 and the processor 701 may be communicatively connected by means of the bus interface, the functions of the processor 701 may also be implemented by the transceiver 702, and the functions of the transceiver 702 may also be implemented by the processor 701. It should be noted that, the above-mentioned device provided in the embodiments of the present application can implement all method steps implemented by the foregoing method embodiments, and can achieve the same technical effect, and the same parts between the method embodiments and this embodiment and beneficial effects of this embodiment are not described in detail herein.

In some embodiments of the present application, a computer-readable storage medium is further provided, wherein a program is stored thereon, and when the program is executed by the processor, the following steps are implemented:
    sending first indication information to the terminal, where the first indication information indicates at least one of the following information: 1) a PDCCH detection behavior: 2) a transmission method of a multicast and/or broadcast service; and 3) a PDSCH receiving behavior;
    determining, according to the first indication information, a PUCCH resource used by the terminal to report HARQ of the PDSCH, and detecting, on the determined PUCCH resource, HARQ feedback information transmitted by the terminal.

When the program is executed by the processor, all implementations of the HARQ feedback method for the multicast and/or broadcast service applied to the base station side can be implemented, and the same technical effect can be achieved, and thus all implementations are not repeated here for avoiding repetition.

A person of ordinary skill in the art may be aware that units and algorithm steps of the examples described in connection with the embodiments disclosed herein can be implemented by electronic hardware, or a combination of computer software and electronic hardware. Whether the functions are performed by hardware or software depends on specific applications and design constraint conditions of the technical solutions. A person skilled in the art may use different methods to implement the described functions for different specific applications, but it should not be considered that the implementation goes beyond the scope of the present application.

It may be clearly understood by a person skilled in the art that, for the convenience and brevity of description, specific operational process of systems, apparatuses, and units described above may be obtained by referring to the corresponding processes in the foregoing method embodiments, and details thereof are not described herein again.

In the embodiments provided in the present application, it should be understood that the disclosed apparatuses and methods may be implemented in other manners. For example, the apparatus embodiments described above are merely illustrative, for example, the division of the units is merely a logical function division, and there may be another division manner during actual implementation, for example, multiple units or components may be combined or may be integrated into another system, or some features may be ignored or not performed. Additionally, the displayed or discussed mutual coupling or direct coupling or communication connection may be an indirect coupling or communication connection through some interfaces, devices, or units, and may be electrical, mechanical, or in other forms.

The units described as separate components may or may not be physically separate, and components displayed as units may or may not be physical units, that is, may be located in one place, or may be distributed on multiple network units. Some or all of the units may be selected according to actual needs to achieve the objectives of the solutions of the embodiments of the present application.

In addition, functional units in the embodiments of the present application may be integrated into one processing unit, or each of the units may exist alone physically, or two or more units may be integrated in one unit.

When the functions are implemented in the form of a software functional unit and sold or used as an independent product, the functions may be stored in a computer-readable storage medium. Based on this understanding, a part, which contributes to the related art, of the technical solutions of the present application or a part of the technical solutions can be embodied in the form of a software product, and the computer software product is stored in a storage medium, and comprises several instructions for enabling a computer device (which may be a personal computer, a server, or a network device, etc.) to perform all or part of the steps of the methods described in the embodiments of the present application. The foregoing storage medium includes various media that can store program codes, such as a USB flash disk, a mobile hard disk, a read-only memory (ROM), a random access memory (RAM), a magnetic disk, or an optical disk.

The foregoing describes merely specific embodiments of the present application, but the scope of protection of the present application is not limited thereto, and any person skilled in the art could easily conceive of change or replacement within the technical scope disclosed in the present application, all of which should be covered within the protection scope of the present application. Therefore, the protection scope of the present application shall be consistent to the protection scope of the claims.

What is claimed is:

1. A Hybrid Automatic Repeat reQuest (HARQ) feedback method for a multicast and/or broadcast service, comprising:
receiving, by a terminal, first indication information transmitted by a network, wherein the first indication information indicates a transmission method of the multicast and/or broadcast service, wherein the transmission method of the multicast and/or broadcast service comprises at least one of following: Point-to-Point (PTP) transmission; and Point to Multiple Point (PTM) transmission; and
determining, by the terminal based on the first indication information, a Physical Uplink Control CHannel (PUCCH) resource used for reporting HARQ of a PDSCH, wherein the PUCCH resource comprises a first PUCCH resource and/or a second PUCCH resource, wherein the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH;
wherein the method further comprises:
in a case that the first indication information indicates PTP transmission and PTM transmission,
if the terminal does not correctly decode a third type of data packet transmitted on a PDSCH scheduled by the common PDCCH or a PDSCH delivered by the PTM transmission, and does not correctly decode a same third type of data packet transmitted on the PDSCH scheduled by the terminal-specific PDCCH or a PDSCH transmitted delivered by the PTP transmission, reporting HARQ information of the third type of data packet on the second PUCCH.

2. The method according to claim 1, wherein the first indication information further indicates a PDCCH detection behavior;
wherein the PDCCH detection behavior comprises any one of following:
detecting a terminal-specific PDCCH;
detecting a common PDCCH;
detecting a common PDCCH and a terminal-specific PDCCH.

3. The method according to claim 2, wherein the first indication information further indicates a PDSCH receiving behavior;
wherein the PDSCH receiving behavior comprises any one of following:
receiving a PDSCH scheduled by a terminal-specific PDCCH;
receiving a PDSCH scheduled by a common PDCCH;
receiving a PDSCH scheduled by the terminal-specific PDCCH and a PDSCH scheduled by the common PDCCH.

4. The method according to claim 1, further comprising:
receiving, by the terminal, configuration information of the first PUCCH resource transmitted by the network, wherein the first PUCCH resource is used by a terminal to report HARQ information for a first PDSCH, the first PDSCH is a PDSCH scheduled by the common PDCCH, or a PDSCH delivered by the PTM transmission, the first PUCCH resource is a PUCCH shared by at least one terminal;
receiving, by the terminal, configuration information of the second PUCCH resource transmitted by the network, the second PUCCH resource is used by the terminal to report HARQ information of a second PDSCH, the second PDSCH is a PDSCH scheduled by the terminal-specific PDCCH, or a PDSCH delivered by the PTP transmission, and the second PUCCH resource is a terminal-specific PUCCH.

5. The method according to claim 3, wherein the method further comprises:
in a case that the first indication information indicates at least one of: detecting the common PDCCH, the PTM transmission and receiving the PDSCH scheduled by the common PDCCH,
if the terminal does not correctly decode a first type of data packet transmitted on a PDSCH scheduled by the common PDCCH or a PDSCH delivered by the PTM transmission, reporting HARQ information of the first type of data packet on the first PUCCH resource;
or,
the method further comprises:
in a case that the first indication information indicates at least one of: detecting the terminal-specific PDCCH, the PTP transmission, and receiving the PDSCH scheduled by the terminal-specific PDCCH,
reporting, by a terminal on the second PUCCH, HARQ information of the second type of data packet transmitted on the PDSCH scheduled by the terminal-specific PDCCH or the PDSCH delivered by the PTP transmission;
or,
the method further comprises:
in a case that the first indication information indicates at least one of: detecting a common PDCCH and a terminal-specific PDCCH, PTP transmission and PTM transmission, and receiving a PDSCH scheduled by the terminal-specific PDCCH and a PDSCH scheduled by the common PDCCH,
if the terminal successfully receives a fourth type of data packet transmitted on the PDSCH scheduled by the common PDCCH or a PDSCH delivered by the PTM transmission, and/or correctly decodes a same fourth type of data packet transmitted on the PDSCH scheduled by the terminal-specific PDCCH or a PDSCH delivered by the PTP transmission, then reporting HARQ information of the fourth type of data packet on the second PUCCH.

6. The method according to claim 5, wherein in case of reporting HARQ information of the third type of data packet on the second PUCCH, the method further comprises:
determining, by the terminal according to a predefined first feedback policy, or according to second indication information transmitted by the network, that HARQ information of the third type of data packet is reported on the second PUCCH.

7. The method according to claim 5, wherein in case of reporting HARQ information of the fourth type of data packet on the second PUCCH, the method further comprises:
determining, according to a predefined second feedback policy, or according to third indication information transmitted by the network, that HARQ information of the fourth type of data packet is reported on the second PUCCH.

8. A Hybrid Automatic Repeat reQuest (HARQ) feedback method for a multicast and/or broadcast service, comprising:
sending first indication information to a terminal by a base station, wherein the first indication information indicates a transmission method of the multicast and/or broadcast service, wherein the transmission method of the multicast and/or broadcast service comprises at least one of following: Point-to-Point (PTP) transmission; and Point to Multiple Point (PTM) transmission; and
determining, by the base station based on the first indication information, a Physical Uplink Control CHannel (PUCCH) resource used by the terminal for reporting HARQ of a PDSCH, and detecting, on the determined PUCCH resource, HARQ feedback information transmitted by the terminal;
wherein the PUCCH resource comprises a first PUCCH resource and/or a second PUCCH resource, wherein the first PUCCH resource is a PUCCH resource associated with a common PDCCH or indicated by a common PDCCH, and the second PUCCH resource is a PUCCH resource associated with a terminal-specific PDCCH or indicated by a terminal-specific PDCCH;
wherein determining, by the base station based on the first indication information, the PUCCH resource used by the terminal for reporting the HARQ of the PDSCH, and detecting, on the determined PUCCH resource, the HARQ feedback information transmitted by the terminal comprises:
in a case that the first indication information indicates PTP transmission and PTM transmission, detecting, by the base station on the second PUCCH resource, HARQ information for the third type of data packet transmitted by the terminal, wherein the third type of data packet is a same third type of data packet which the terminal does not correctly decode both on the PDSCH scheduled by the common PDCCH or on the PDSCH delivered by the PTM transmission, and on the PDSCH scheduled by the terminal-specific PDCCH or on the PDSCH delivered by the PTP transmission.

9. The method according to claim 8, wherein the first indication information further indicates a PDCCH detection behavior;
wherein the PDCCH detection behavior comprises any one of following:
detecting a terminal-specific PDCCH;
detecting a common PDCCH;
detecting a common PDCCH and a terminal-specific PDCCH.

10. The method according to claim 9, wherein the first indication information further indicates a PDSCH receiving behavior;
wherein the PDSCH receiving behavior comprises any one of following:
receiving a PDSCH scheduled by a terminal-specific PDCCH;
receiving a PDSCH scheduled by a common PDCCH;
receiving a PDSCH scheduled by the terminal-specific PDCCH and a PDSCH scheduled by the common PDCCH.

11. The method according to claim 8, further comprising:
sending, by the base station, configuration information of the first PUCCH resource to the terminal, wherein the first PUCCH resource is used by the terminal to report HARQ information for a first PDSCH, the first PDSCH is a PDSCH scheduled by the common PDCCH, or a PDSCH delivered by the PTM transmission, the first PUCCH resource is a PUCCH shared by at least one terminal;
sending, by the base station, configuration information of the second PUCCH resource to the terminal, the second PUCCH resource is used by the terminal to report HARQ information of a second PDSCH, the second PDSCH is a PDSCH scheduled by the terminal-specific PDCCH, or a PDSCH delivered by the PTP transmission, and the second PUCCH resource is a terminal-specific PUCCH.

12. The method according to claim 10, wherein,
determining, by the base station based on the first indication information, the PUCCH resource used by the terminal for reporting the HARQ of the PDSCH, and detecting, on the determined PUCCH resource, the HARQ feedback information transmitted by the terminal further comprises:
in a case that the first indication information indicates at least one of: detecting a common PDCCH, PTM transmission and receiving a PDSCH scheduled by the common PDCCH,
detecting, on a first PUCCH resource by the base station, HARQ information of a first type of data packet transmitted from the terminal, wherein the first type of data packet is a type of data packet that the terminal does not correctly decode on the PDSCH scheduled by the common PDCCH or the PDSCH delivered by the PTM transmission;
or,
determining, by the base station based on the first indication information, the PUCCH resource used by the terminal for reporting the HARQ of the PDSCH, and detecting, on the determined PUCCH resource, the HARQ feedback information transmitted by the terminal further comprises:
in a case that the first indication information indicates at least one of: detecting a terminal-specific PDCCH, PTP transmission, and receiving a PDSCH scheduled by a terminal-specific PDCCH, detecting, by the base station on a second PUCCH resource, HARQ information of the second type of data packet transmitted by the terminal, wherein the second type of data packet is the data packet transmitted on the PDSCH scheduled by the terminal-specific PDCCH or the PDSCH delivered by the PTP transmission;
or,
determining, by the base station based on the first indication information, the PUCCH resource used by the terminal for reporting the HARQ of the PDSCH, and detecting, on the determined PUCCH resource, the HARQ feedback information transmitted by the terminal further comprises:
in case that the first indication information indicates at least one of: detecting a common PDCCH and a terminal-specific PDCCH, PTP transmission and PTM transmission, and receiving a PDSCH scheduled by a terminal-specific PDCCH and a PDSCH scheduled by a common PDCCH,
detecting, by the base station on the second PUCCH resource, HARQ information for a fourth type of data packet transmitted by the terminal, wherein the fourth type of data packet is a data packet successfully received by the terminal on the PDSCH scheduled by the common PDCCH or a PDSCH delivered by the PTM transmission, and/or a same data packet successfully received on the PDSCH scheduled by the terminal-specific PDCCH or the PDSCH delivered by the PTP transmission.

13. The method according to claim 12, wherein in case of detecting, by the base station on the second PUCCH resource, HARQ information for the third type of data packet transmitted by the terminal, the method further comprises:

determining, by the base station according to a predefined first feedback policy, that HARQ information for the third type of data packet is detected on the second PUCCH; or, sending second indication information to the terminal by the base station, to instruct the terminal to report the HARQ information for the third type of data packet on the second PUCCH.

14. The method according to claim 12, wherein in case of detecting, by the base station on the second PUCCH resource, HARQ information for the fourth type of data packet transmitted by the terminal, the method further comprises:

determining, by the base station according to a predefined second feedback policy, that HARQ information for a fourth type of data packet is detected on a second PUCCH; or, sending third indication information to the terminal by the base station, to instruct the terminal to report HARQ information for the fourth type of data packet on the second PUCCH.

15. A terminal, comprising:

a processor, a memory, and a program stored on the memory and executable by the processor, wherein when the program is executed by the processor, the steps of the method according to claim 1 are implemented.

16. A base station, comprising: a processor, a memory, and a program stored on the memory and executable by the processor, wherein when the program is executed by the processor, the steps of the method according to claim 8 are implemented.

* * * * *